(12) United States Patent
O'Brien et al.

(10) Patent No.: US 10,378,906 B2
(45) Date of Patent: Aug. 13, 2019

(54) SYSTEMS AND METHODS FOR AUTONOMOUS DRONE NAVIGATION

(71) Applicant: Walmart Apollo, LLC, Bentonville, AR (US)

(72) Inventors: John Jeremiah O'Brien, Farmington, AR (US); Donald High, Noel, MO (US); Chandrashekar Natarajan, San Ramon, CA (US); Nathan Glenn Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/723,889

(22) Filed: Oct. 3, 2017

(65) Prior Publication Data
US 2018/0094935 A1    Apr. 5, 2018

Related U.S. Application Data

(60) Provisional application No. 62/403,985, filed on Oct. 4, 2016.

(51) Int. Cl.
| | |
|---|---|
| *G01C 22/00* | (2006.01) |
| *G05D 1/00* | (2006.01) |
| *G01C 21/20* | (2006.01) |
| *G06K 19/06* | (2006.01) |
| *G06T 7/73* | (2017.01) |
| *G06K 7/14* | (2006.01) |
| *G06K 7/10* | (2006.01) |
| *G05D 1/10* | (2006.01) |
| *G06Q 10/08* | (2012.01) |
| *B64C 39/02* | (2006.01) |

(Continued)

(52) U.S. Cl.
CPC .......... *G01C 21/206* (2013.01); *B64C 39/024* (2013.01); *G05D 1/0088* (2013.01); *G05D 1/102* (2013.01); *G06K 7/10722* (2013.01); *G06K 7/10821* (2013.01); *G06K 7/1404* (2013.01); *G06K 19/06009* (2013.01); *G06Q 10/08* (2013.01); *G06T 7/73* (2017.01); *B64C 2201/141* (2013.01); *G06T 2207/30252* (2013.01); *H04N 5/232* (2013.01)

(58) Field of Classification Search
CPC .. G01C 21/206; G06Q 10/087; G05D 1/0088; G06K 7/1404; G06K 19/06009
USPC ......................................... 701/25; 340/527.1
See application file for complete search history.

(56) References Cited

U.S. PATENT DOCUMENTS

| | | |
|---|---|---|
| 8,989,922 B2 | 3/2015 | Jones et al. |
| 9,033,116 B2 | 5/2015 | Breed |

(Continued)

OTHER PUBLICATIONS

International Search Report and Written Opinion for PCT/US2017/054910 dated Dec. 12, 2017, pp. 1-14.

(Continued)

*Primary Examiner* — Mahmoud S Ismail
(74) *Attorney, Agent, or Firm* — McCarter & English, LLP; David R. Burns

(57) ABSTRACT

Exemplary embodiments relate to an indoor drone system including an autonomous drone configured for autonomous navigation, and a computing system in communication with the autonomous drone. The autonomous drone includes an optical code reader and at least one navigational sensor. The computing system includes a verification module.

16 Claims, 6 Drawing Sheets

(51) Int. Cl.
*G08B 13/14* (2006.01)
*H04N 5/232* (2006.01)

(56) References Cited

U.S. PATENT DOCUMENTS

| | | | |
|---|---|---|---|
| 9,164,506 B1 | 10/2015 | Zang | |
| 9,280,757 B2 | 3/2016 | Parpia et al. | |
| 9,964,951 B1* | 5/2018 | Dunn | G05D 1/0088 |
| 2008/0001748 A1* | 1/2008 | Childress | G06K 17/00 |
| | | | 340/572.1 |
| 2008/0231451 A1* | 9/2008 | Kamel | G06K 17/00 |
| | | | 340/572.1 |
| 2010/0250022 A1 | 9/2010 | Hines et al. | |
| 2014/0306799 A1 | 10/2014 | Ricci | |
| 2014/0354809 A1 | 12/2014 | Shondel | |
| 2016/0078759 A1 | 3/2016 | Nerayoff et al. | |
| 2016/0247115 A1* | 8/2016 | Pons | G06Q 10/087 |
| 2016/0247116 A1 | 8/2016 | Olivo et al. | |

OTHER PUBLICATIONS

Using Drones and RFID to Track Inventory at AUVSI 2016, YouTube, last viewed Oct. 3, 2017.
Using Drones and RFID to Track Construction Inventory and People Tracking, YouTube, last viewed Oct. 3, 2017.
DJI—Introducing the Matrice 600, YouTube, last viewed Oct. 3, 2017.
DroneScan as a solution, http://www.dronescan.co/, May 12, 2016.
Morlin-Yron, Sophie, Are flying robots the perfect co-workers?, http://edition.cnn.com/2016/05/12/africa/drone-scan-inventory-technology-south-africa/index.html, viewed Aug. 17, 2017.
Ackerman, Evan, Flying Inventory Assistant Are a Good Use for Drones, IEEE Spectrum, http://spectrum.ieee.org/automaton/robotics/drones/flying-inventory-assistants-are-a-good-use-for-drones, last viewed Aug. 18. 2017.
InventAIRy—Identifikation mit autonomen Flugrobotern, https://www.youtube.com/watch?v=Ssbl4Ge7Bnk, YouTube, last viewed Oct. 3, 2017.
Supply Chain Management—Be ready for the drone invasion @ warehouse, http://www.infosysblogs.com/supply-chain/2016/07/be_ready_for_the_drone_invasion_html, viewed Aug. 18, 2017.
Heater, Brian, Keeping track of warehouse inventories with an army of fully autonomous drones, https://techcrunch.com/2016/09/12/intelligent-flying-machines/, Disrupt SF 2016, Pier 48, San Francisco, Sep. 12, 2016.
Eyesee, the inventory-taking drone, YouTube, https://www.youtube.com/watch?v=R1qtwoPde0U, viewed Oct. 3, 2017.

* cited by examiner

SYSTEMS AND METHODS FOR AUTONOMOUS DRONE NAVIGATION

CROSS-REFERENCE TO RELATED PATENT APPLICATIONS

This application claims priority to U.S. Provisional Application No. 62/403,985 filed on Oct. 4, 2016, the content of which is hereby incorporated by reference in its entirety

BACKGROUND

Large facilities, such as warehouses or other large buildings, store and/or display large amounts of different items. The items in storage and/or in the item displays require checking to ensure their presence and compliance with any company rules for item displays. Conventionally, checking the storage of items and/or item displays has utilized company employees to manually verify the status of items and the compliance of the item displays with any applicable rules.

Drones are robotic devices that may function autonomously without direct user control or alternatively may be directly controlled by users. Drones may be aerial vehicles, may be land-based vehicles and/or may function in underwater environments. Autonomous aerial drones may navigate indoor facilities without instruction.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
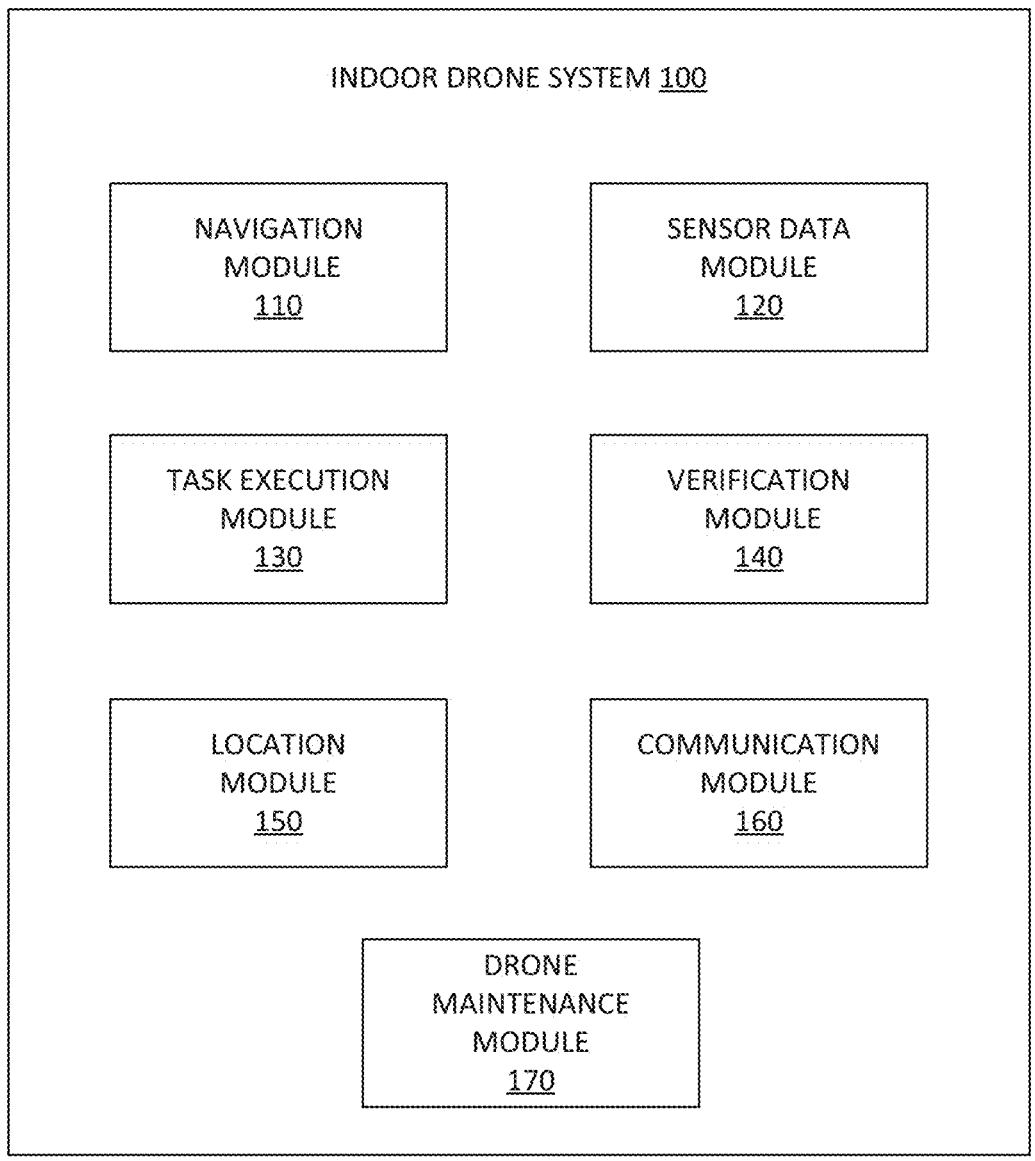
FIG. 1 is a block diagram showing an indoor drone system implemented in modules, according to an example embodiment.

Maintaining accurate accountability of items in distribution centers and warehouses is a time consuming process involving many hours of labor as well as inaccuracies by the personnel. As a result, indoor inventory cycle counting is rarely accomplished, and thus, inventory levels have a potential for inaccuracy. Further, when these processes are conducted, they require a near shutdown of the distribution center or warehouse operations. Also, the process of verifying the status of items requires personnel to climb tall staircase or ladders or use a bucket truck to reach any items stored at the higher shelves of the storage unit, which introduces risk of injury to personnel. However, items must be checked periodically to determine if items are missing, and to locate misplaced items.

One alternative to the use of personnel traversing a warehouse to perform checks on the status of items is to use a drone in place of the personnel. Using a drone to perform tasks may result in higher efficiency and lower costs. However, the most cost savings occur if the drone can be operated autonomously without requiring constant interaction with a human. Conventional systems use GPS or beacons for autonomous operation of a drone outdoors. However the use of GPS and beacons is not well-suited for autonomous operation of a drone indoors to perform inventory checking and other tasks.

Embodiments of the present invention provide a technique for autonomous drone operation in an indoor facility such as warehouses and distribution centers in order to verify a status and location of items. Further, the described system allows the drone to check for security breaches by visual recognition of security strips and seals, as well as damaged pallets and packages.

Described in detail herein are systems and methods for an indoor drone system. The indoor drone system can be used, for example, to check inventory in warehouses. In one embodiment, multiple drones are deployed to autonomously navigate an indoor facility and scan each storage unit and storage case housed in the indoor facility. The system, which includes at least one or more drones, a computing system or computational device that may act as a command center, and a database, verifies if the storage cases correspond to the correct storage unit based on the identifier data scanned by the drone. If there is a mismatch between the storage case and storage unit then a notification may be generated.

As used herein, "drone" refers to an unmanned aerial or ground vehicle. The drone may be a commercially available drone capable of performing the functionalities described herein, including operating in an indoor environment. The drone may be capable of autonomous flight, may be aware of its surroundings, and may be programmable. The drone may be coupled to one or more sensors or devices that aid in performance of the functionalities described herein. The sensors or devices may include, but are not limited to, an optical code reader, an image capture device, a motion sensor, a distance sensor, an infrared sensor, a thermal sensor, a sonar sensor, and the like. The drone may also include a processing device or an on-board computing device and memory to store instructions or data, and communication ability to communicate with a separate computational device (e.g.: a command center), separate computing system or other drones.

As used herein, "storage unit" refers to a shelving unit or system, a large shelving unit or system for use in warehouses, or other storage units suitable for storing and organizing items or storage cases in warehouses or distribution centers. The indoor facility includes multiple storage units, and an optical machine-readable label may be affixed to each of the storage units. The optical machine-readable label represents a unique identifier for the respective storage unit.

As used herein, "storage case" refers to a pallet, a box, a container, or other storage cases suitable for storing and organizing items in warehouses or distribution centers. One or more storage cases may be stored at a storage unit in the indoor facility. An optical machine-readable label may be affixed to each storage case. The optical machine-readable label represents a unique identifier for the respective storage unit.

As used herein, "optical machine-readable label" or "optical machine-readable identifier" refers to a code printed on a label that is readable by an optical code reader or device. The code may include, but is not limited to, a barcode, 2D or matrix barcodes, quick response (QR) codes, and the like.

FIG. 1 is a block diagram showing an indoor drone system 100 in terms of functional modules according to an example embodiment. The modules may include a navigation module 110, a sensor data module 120, a task execution module 130, a verification module 140, a location module 150, a communication module 160, and a drone maintenance module 170. One or more of the modules of system 100 may be implemented in drone 410, device 420 or server 430 of FIG. 4. The modules may include various circuits, circuitry and one or more software components, programs, applications, or other units of code base or instructions configured to be executed by one or more processors included in drone 410, device 420 or server 430. Although modules 110, 120, 130, 140, 150, 160 and 170 are shown as distinct modules in FIG. 1, it should be understood that modules 110, 120, 130, 140, 150, 160 and 170 may be implemented as fewer or more modules than illustrated. It should be understood that modules 110, 120, 130, 140, 150, 160 and 170 may communicate with one or more components included in system 400 (FIG. 4), such as drone 410, device 420, server 430 or database(s) 440.

In one embodiment, navigation module 110 may be configured to analyze and manage a route for navigation by a drone in an indoor facility. The navigation module 110 may also be responsible for dynamically navigating the drone when obstacles are detected. In an example embodiment, the navigation module 110 may be included in the autonomous drone (e.g., drone 410). In some embodiments, the navigation module 110 can implement one or more of the following for location awareness and to assist in navigations: Ultra Wide Band communication, sound-echo location through sonar, radar, LED lights, artifacts (e.g.: images and symbols), color-coded fixed locations visible to drone (e.g. pipes, lanes, etc.), OCR recognition, track recognition (for forklifts), Wi-Fi, Auto CAD, virtual mapping, Simultaneous Localization and Mapping (SLAM), Flash LIDAR, HD Camera, infrared, thermal detection (e.g.: heat signatures), triangulation (beacons and signaling equipment) side and top mounted laser altimeters (providing horizontal and vertical measurement) and/or a GPS repeater.

In an embodiment, the sensor data module 120 may be configured to manage and analyze data sensed by one or more sensors coupled to the drone. The data sensed by the sensors may include location data, obstacle identification data, storage unit identification data, storage case identification data, and the like. In an example embodiment, the sensor data module 120 is included in the autonomous drone (e.g., drone 410). In another embodiment, the sensor data module 120 is included in the computational device (e.g., device 420) or the server (e.g., sever 430).

In one embodiment, the task execution module 130 may be configured to manage performance of a task provided to the drone. In an example embodiment, the task may be checking the status and/or location of items in a facility, where the task execution module 130 manages item data, identifier data sensed by the drone, and facilitates navigation of the drone through the indoor facility to complete the checking of the item status and/or location. The task execution module 130 may cause the drone to operate the optical code reader to scan optical machine-readable labels affixed to storage units and storage cases. In another embodiment, the task may be a search and locate task, where the task execution module 130 receives an identifier associated with a storage case that needs to be located in the indoor facility. The task execution module 130 facilitates navigation of the drone through the indoor facility while scanning optical machine-readable labels to locate the received identifier. In an example embodiment, the task execution module 130 is included in the autonomous drone (e.g., drone 410).

In one embodiment the verification module 140 may be configured to analyze data sensed or scanned by the drone. The verification module 140 may be configured to receive the identifier for a selected storage unit and the identifier for a selected storage case from the drone, and verify whether the identifiers exist in a database as an assigned pair. In the event that the identifiers are not an assigned pair in the database, the verification module 140 generates a notification. In an example embodiment, the verification module 140 is included in the autonomous drone (e.g., drone 410). In another embodiment, the verification module 140 is included in the computational device (e.g., device 420) or the server (e.g., sever 430).

In an embodiment, the location module 150 may be configured to manage and analyze location data sensed by the drone. In some embodiments, the location module 150 is included in the drone. In other embodiments, the location module 150 is included in a separate computational device (e.g., command center) or a server. The location module 150 determines the location of the drone in the indoor facility during navigation.

In one embodiment, the communication module 160 may be configured to facilitate communication between the drone and/or the computational device or server, and/or facilitate communications between the drone and other drones. In an example embodiment, the communication module 160 is included in the autonomous drone (e.g., drone 410). In an embodiment, the drone maintenance module 170 may be configured to analyze components of the drone to determine if maintenance is required, including charging of batteries, repair of tools or components, update of software, and the like. The drone maintenance module 170 may instruct the drone to navigate to a docking or charging station when the drone power is low or when the drone requires maintenance. In an example embodiment, the drone maintenance module 170 is included in the autonomous drone (e.g., drone 410).

Figure 2:
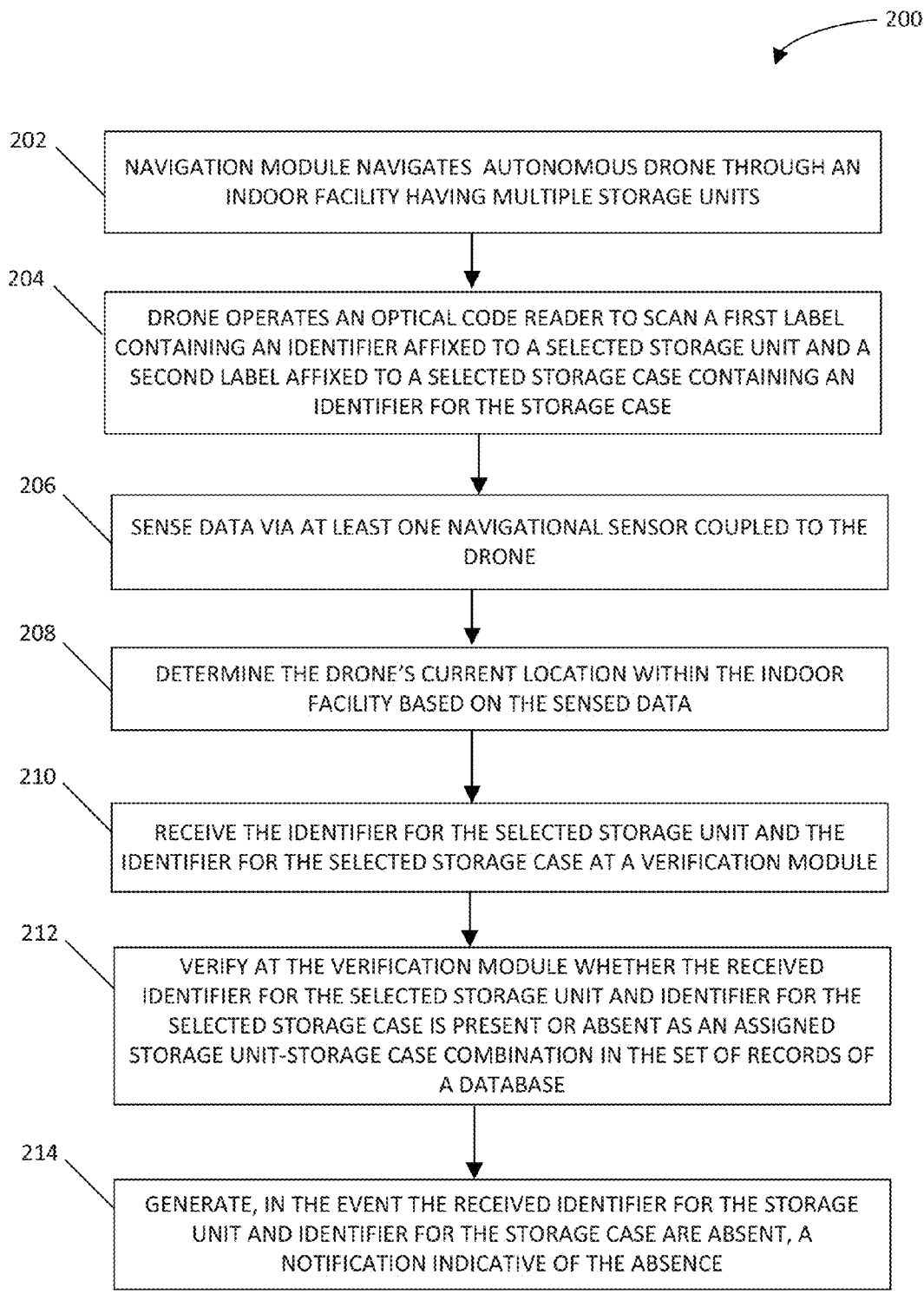
FIG. 2 is a flowchart showing an exemplary method for drone navigation, according to an example embodiment.

FIG. 2 is a flowchart showing an exemplary method 200 for navigating a drone, according to an example embodiment. The steps of method 200 may be performed by one or more modules shown in FIG. 1. It will be appreciated that the method is programmatically performed by one or more computer-executable processes executing on, or in communication with, one or more computing systems or processors described further below.

At step 202, the navigation module 110 navigates the autonomous drone through an indoor facility having multiple storage units. Each storage unit may include an optical readable identifier. The autonomous drone may include an optical code reader and at least one navigational sensor. In an example embodiment, the drone is coupled to an infrared sensor to detect obstacles in the indoor facility during navigation.

At step 204, the task execution module 130 causes the drone to operate an optical code reader to scan a first optical machine-readable label containing an identifier affixed to a selected storage unit from the multiple storage units, and scan a second optical machine-readable label affixed to a selected storage case, where the second label includes an identifier for the selected storage case. The identifiers may be transmitted from the drone via its communication interface to a separate computing system or device for further processing.

At step 206, the sensor data module 120 senses data via at least one navigational sensor coupled to the drone. The sensor data module 120 may cause the drone to operate an image capturing device coupled to the drone to capture images and/or video while the drone navigates the indoor facility. The captured images may be transmitted from the drone via its communication interface to the separate computing system or device for further processing.

At step 208, the location module 150 determines the drone's current location within the indoor facility based on the sensed data at step 206. In an example embodiment, the drone is coupled to an image capturing device (for example, a camera). The location module 150 may cause the drone to operate the image capturing device to capture an image of the floor while navigating the indoor facility, where the floor may have a particular pattern or text that can be analyzed to determine the location of the drone in the facility. In another embodiment, image data may be used by the location module 150 to identify a landmark to fix the drone's position in the facility with respect to a CAD drawing of the facility.

At step 210, the verification module 140 executing on the separate computing system or device receives the identifier for the selected storage unit and the identifier for the selected storage case.

At step 212, the verification module 140 verifies whether the received identifier for the selected storage unit and identifier for the selected storage case is present or absent as an assigned storage unit-storage case combination or pair in a set of records of a database.

At step 214, in the event that the received identifier for the storage unit or identifier for the storage case are absent from the database, the verification module 140 generates a notification indicative of the absence. The notification may be transmitted to another user device or a server. The notification may be logged or recorded in a database. The location of the error may also be recorded. For example, the drone may record the location of the storage case that does not match the storage unit, therefore, the location of the mismatched storage case is recorded so that it can be easily found at a later time. In this manner, the drone is configured to perform an item checking task.

In an example embodiment, the indoor drone system 100 may also generate a notification if damage to the storage case or storage unit is detected. The damage may be detected using video analytics of the images captured by the drone. In some embodiments, the storage cases may include a security seal, and the indoor drone system 100 may generate a notification if a broken security seal is detected. The broken security seal may be detected using video analytics of the images captured by the drone and transmitted back to a computing system performing the video analytics.

In an example embodiment, the method 200 also includes receiving a provided storage case identifier communicated from autonomous drone. For example, the drone may autonomously navigate the indoor facility and scan one or more optical machine-readable labels affixed to one or more storage cases to locate an optical machine-readable label corresponding to the provided storage case identifier. Upon locating the provided storage case identifier, the drone may store the location of the optical machine-readable label corresponding to the provided storage case identifier. In this manner, the drone is configured to perform a search and locate task.

The indoor facility may have a lighting system that is activated when motion is detected. However, in some cases, the motion detectors for the lighting system may not detect the presence of a drone, so the lights in the facility remain off. The drone may need some lighting to effectively capture images and scan optical identifiers. In one embodiment, the drone is configured to communicate with the indoor facility's lighting system to dynamically turn on the lights in the facility when they are off. The drone may transmit instructions or signals to the lighting system to turn on lights in a specific area of the indoor facility based on the drone's location. In another embodiment, the drone may be coupled to a light (such as a flashlight) that can be turned on based on lighting conditions in the facility sensed by the drone. In this manner, the drone is capable of controlling the lighting conditions to improve the quality of images captured by the drone and to improve reading of the identifiers affixed to the storage units and storage cases.

Figure 3:
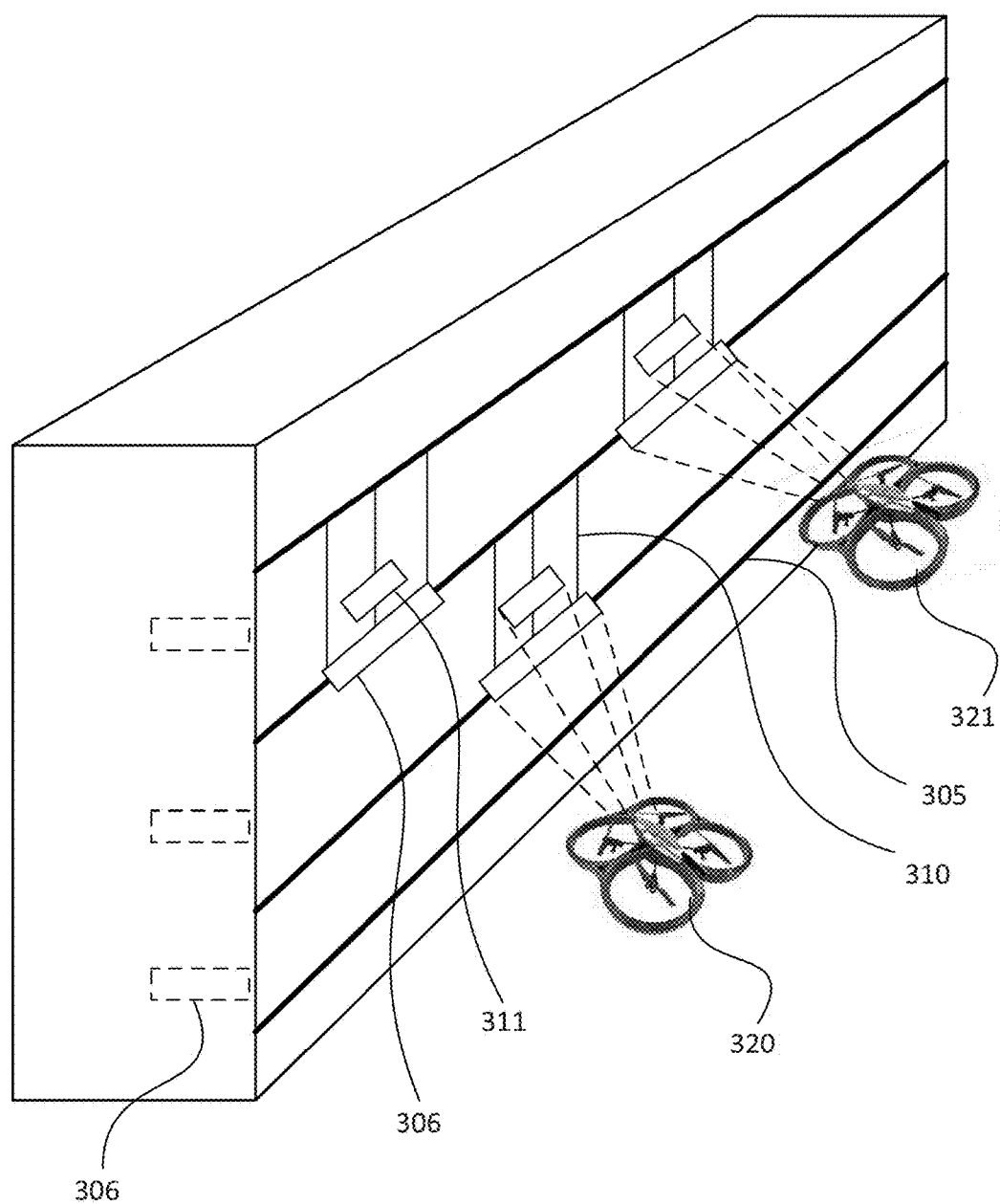
FIG. 3 is a schematic showing an exemplary storage unit and storage case for use by the indoor drone system, according to an example embodiment.

FIG. 3 is a schematic showing an exemplary storage unit 305 and storage case 310 for use by the indoor drone system, according to an example embodiment. As shown in FIG. 3, an optical machine-readable label 306 is affixed to the storage unit to uniquely identify the storage unit. In an example embodiment, the label 306 is affixed to a specific section of the storage unit 305. In another embodiment, the label 306 is affixed on a side surface of the storage unit 305. In one embodiment, each shelf or section of the storage unit 305 may have a unique identifier.

A second optical machine-readable label 311 is affixed to the storage case 310 to uniquely identify the storage case 310. As shown, multiple drones 320, 321 can navigate the indoor facility to scan labels 306 and 311 to verify the status of different items and their respective locations. The scanned data may be analyzed by the verification module 140 to determine whether the selected storage unit and selected storage case are an assigned pair in the database. For example, in one embodiment, a database may contain a list of storage units cross referenced with records of one or more storage cases respectively assigned to the storage units.

Navigation

The autonomous drone is capable of navigating a route autonomously without further instructions from a user. The drone may be provided with a route to navigate the indoor facility. The route may be optimized based on obstacles and human traffic within the indoor facility.

The autonomous drone may be capable of geolocation awareness. The autonomous drone may also be capable of detecting various objects in the indoor facility. For example, the drone may detect storage units, storage cases, storage containers, equipment, personnel and the like in the indoor facility. The drone may also be capable of detecting waypoint markers on its route. Waypoint markers may be established at a predetermined distance from each fixture in the indoor facility. The drone may further be capable of detecting docking or charging stations and landmarks in the indoor facility.

Even though the autonomous drone may be instructed to navigate an optimized route, the drone may also be capable of making decisions autonomously. The drone may include artificial intelligence for making autonomous decisions to sense and avoid dynamic and static obstacles. The drone may also dynamically optimize the predefined route based on sensed data during its route navigation. The drone may be programmed to tolerate certain exceptions dynamically during its autonomous navigation of the indoor facility.

In an example embodiment, the autonomous drone may dynamically navigate the indoor facility by vertically or horizontally rerouting to avoid obstacles. In some cases, the autonomous drone may return to a base station and wait for certain dynamic obstacles to clear. In another embodiment, the drone may statically navigate around obstacles by communicating data related to the sensed obstacles to a command center device. The command center device may dynamically transmit instructions to the drone to navigate around obstacles.

Sense and Avoid

In an example embodiment, the autonomous drone is configured to identify obstacles during autonomous navigation. The drone may identify obstacles in the indoor facility such as other drones, personnel, power lines, and the like. In one embodiment, the drone is equipped with sensors or devices that allows it to sense and identify objects located above the drone, below the drone, and on either side of the drone. The autonomous drone may also be capable of sensing and determining how far away an object is located. In an example embodiment, the drone is capable of determining which direction a dynamic object (for example, other drones, equipment, forklifts, etc.) is traveling. The drone may be configured to also determine the speed of the object. Using the sensed data, the autonomous drone may be capable of differentiating between objects. For example, the drone may be able to differentiate between personnel, equipment, other drones, and the like.

Autonomous Docking Station

To aid in autonomous functioning of the drone, the drone may be configured to autonomously navigate to a docking station as required. A docking station may be referred to herein as a base station, home base, charging station, and the like. The drone may autonomously navigate to a docking station for refueling or charging its batteries. In case the drone requires maintenance, the drone may also autonomously navigate to the docking station. The drone may autonomously determine that it requires maintenance based on data sensed by the drone. The drone may need maintenance related to its batteries or power pack, sensors, mechanical or electrical components, firmware and the like. In an example embodiment, the drone may be capable of autonomously retooling its components at the docking station.

Command and Control

The autonomous drone may be in communication with a computational device (for e.g., device 420) that acts as a command center. The command center may be in communication with multiple drones that are autonomously navigating the indoor facility or that are in standby mode at a docking station. The communication module 160 may the facilitate communications between the command center and a drone. The command center may facilitate communications between drones, or the drones may communicate to one another directly.

In one embodiment, the drone is expected to be in constant communication with the command center. However, if the communication link is lost or weak, an alert may be generated at the command center, and appropriate steps may be taken to re-establish communication. While the drone may make autonomous decisions in response to detected circumstances, the command center may also transmit commands to the drone to redirect the drone based on data detected by the drone or based on data only available to the command center. For example, the command center may have received data from another drone in the indoor facility that may require redirection of the instant drone during its autonomous navigation of the indoor facility. Another drone may report a crash or obstacle that is undetectable by the instant drone due its location in the indoor facility. The command center may transmit commands to the instant drone to dynamically reroute the drone to avoid the crash or obstacle.

In an example embodiment, the command center may autonomously transmit flight commands to the drone based on a pre-generated route. A route may be generated based on selection of a start point and end point by a user. The command center may generate directions to follow the route, and then convert the directions to command instructions comprehensible by the drone.

The command center may also instruct the drone to monitor, capture, and store images or video, and log statistics and data during its navigation of the indoor facility. The command center may control how often the drone transmits the collected data to a server or to the command center. The command center may instruct the drone to upload its data based on various factors, such as time spent in flight, memory capacity of the drone, occurrence of a dynamic event, and the like.

Sensors and Technology for Localization and Obstacle Detection

Various sensors and systems may be used to sense, detect and collect data using the drone during navigation of the indoor facility. Some of the data collected by the drone is location data that aids in determining where the drone is located in the indoor facility.

In one embodiment an ultra-wideband (UWB) system is used by the drone for indoor positioning. In this embodiment, beacons for transmitting a signal may be disposed throughout the indoor facility or at particular landmarks, and a reader or receiver is coupled to the drone. Alternatively, the beacon for transmitting a signal may be coupled to the drone, while the readers or receivers are disposed throughout the indoor facility or at particular landmarks.

In another embodiment a smart lighting system for detecting landmarks and static objects in the indoor facility is used by the drone. In this embodiment, a light, for example a light-emitting diode (LED), may be disposed at particular landmarks and static objects. The light may be of a particular color or may emit a particular wavelength that when sensed by the drone allows for identification of the drone's location (by the drone or the command center).

In a further embodiment a differential global positioning system (DGPS) may be employed by the drone for localization and obstacle detection. The DGPS is an enhancement to Global Positioning System that provides improved location accuracy, from the 15-meter nominal GPS accuracy to within centimeters in case of certain implementations. In implementing the DGPS in the indoor facility, tests may be performed that include defined waypoints (compared to actual waypoints) based on calculation of variance from the actual waypoint, and store the defined waypoints in a database. The tests may be performed for straight line flight of the drone, interruptions in flight, landing and takeoff of the drone, known and dynamic obstructions, and the like.

In another embodiment, accurate landmarks are used to determine the location of the drone. Accurate landmarks may include, but are not limited to, static storage units, static equipment, and static obstacles at particular locations in the indoor facility.

In another embodiment, sonar systems are used to detect static and dynamic objects or obstacles. The drone may be equipped with a sonar system that allows it to detect objects and also sense objects through walls. The data sensed by the sonar system may be used by the drone or the command center to dynamically reroute the drone or to dynamically cause the drone to avoid obstacles.

In one embodiment the drone is coupled with thermal scanners to enable the drone to detect personnel, equipment (that produce heat in idle mode or operating mode), or other heat generating objects.

In another embodiment LIDAR systems and methods are employed by the drone to survey the indoor facility. Using LIDAR a survey or map of the indoor facility can be created by measuring distances to objects by illuminating the object with a light energy (e.g., laser light). The LIDAR system may be coupled to a drone tasked to survey and scan the indoor facility to generate a map of the interior portion of the facility indicating location of static objects such as storage units, equipment, light fixtures, wires, and the like. Scanning using a LIDAR system may generate a 3D point cloud that represents the external surface of objects disposed in the indoor facility. A computational device may be used to analyze the 3D point cloud to generate the map. Using these methods, LIDAR scanning is capable of detecting small obstacles such as wires. The generated map may be used by the command center or the drone to navigate the indoor facility. Alternatively, the drone may be configured to use the LIDAR system to dynamically detect obstacles during navigation, and detect the distance from the obstacle.

In yet another embodiment, suitable 3D mapping technologies are employed to generate a map of the interior environment of the facility. For example, rapid 3D mapping may be used, which employs stereophotogrammerty technology to generate a 3D map using image captures by a drone. In another example, systems and methods part of Project Tango™ (technology platform by Google Inc.) may be employed to facilitate indoor navigation and 3D mapping. In yet another example, video analytics may be used to generate a 3D map of the interior environment of the facility.

Figure 4:
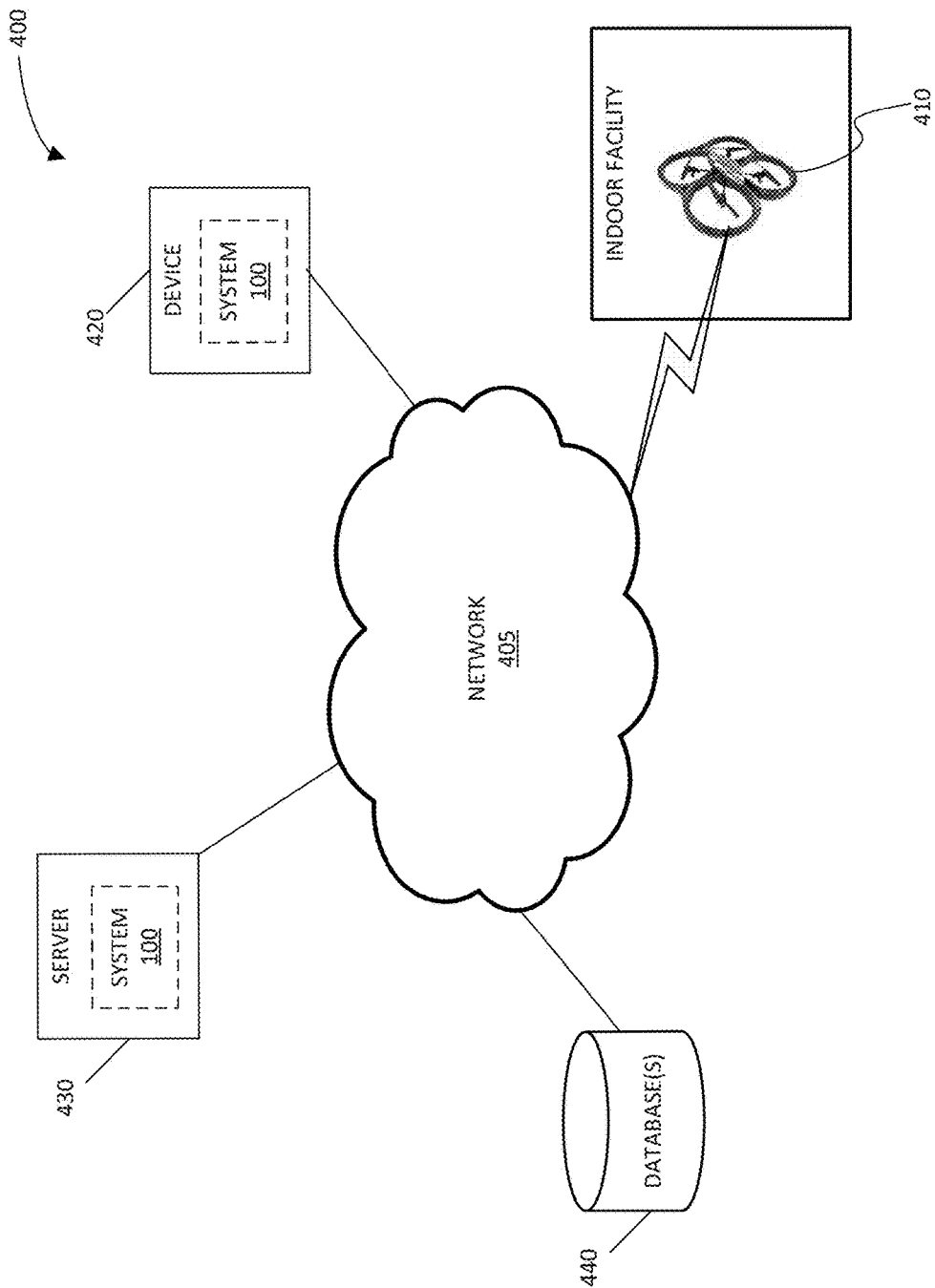
FIG. 4 illustrates a network diagram depicting a system for implementing the indoor drone system, according to an example embodiment.

FIG. 4 illustrates a network diagram depicting a system 400 for implementing the drone navigation system, according to an example embodiment. The system 400 can include a network 405, a drone 410 inside of an indoor facility 409, a device 420, a computing system, such as server 430, and database(s) 440. Each of components 410, 420, 430, and 440 is in communication with the network 405. It will be appreciated that the depicted components may be combined in combinations other than those illustrated herein without departing from the scope of the present invention. For example, the functionality of the device 420 and server 430 may be combined in a single computing system or device.

In an example embodiment, one or more portions of network 405 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The drone 410 may include an optical code reader or scanner, an image capturing device, such as a camera or high-definition camera to capture video, photographs, and/or audio data, one or more sensors, such as a motion detector, infrared sensor, thermal sensor, sonar sensor, and the like. The drone 410 may also include a wireless communication interface or mechanism to facilitate communications with various devices, such as device 420 and/or servers, such as server 430. The drone 410 can include one or more components described in relation to drone 600 shown in FIG. 6.

The device 420 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The device 420 can include one or more components described in relation to computing device 500 shown in FIG. 5. In one embodiment, the device 420 is a tablet computing device operated by an employee of a retail store, warehouse or distribution center.

The device 420 may connect to network 405 via a wired or wireless connection. The device 420 may include one or more applications such as, but not limited to, the indoor drone system 100 described herein.

In an example embodiment, some of the components of the indoor drone system 100 may be included in the device 420, while the other components are included in the server 430. Some of the functionalities of the indoor drone system described herein may be performed by the device 420.

Each of the database(s) 440 and server 430 may be connected to the network 405 via a wired or wireless connection. The server 430 may include one or more computing devices or processors configured to communicate with the drone 410, the device 420, and database(s) 440 via network 405. The server 430 hosts one or more applications or websites accessed by the device 420 and/or facilitate access to the content of database(s) 440. Database(s) 440 include one or more storage devices for storing data and/or instructions (or code) for use by the device 420 and server 430, such as assigned pairings of storage units and storage cases, video or image captured by the drones, mapping of the interior environment of the facility, inventory information, and the like. Database(s) 440, and/or server 430, may be located at one or more geographically distributed locations from each other or from the device 420. Alternatively, database(s) 440 may be included within server 430.

Figure 5:
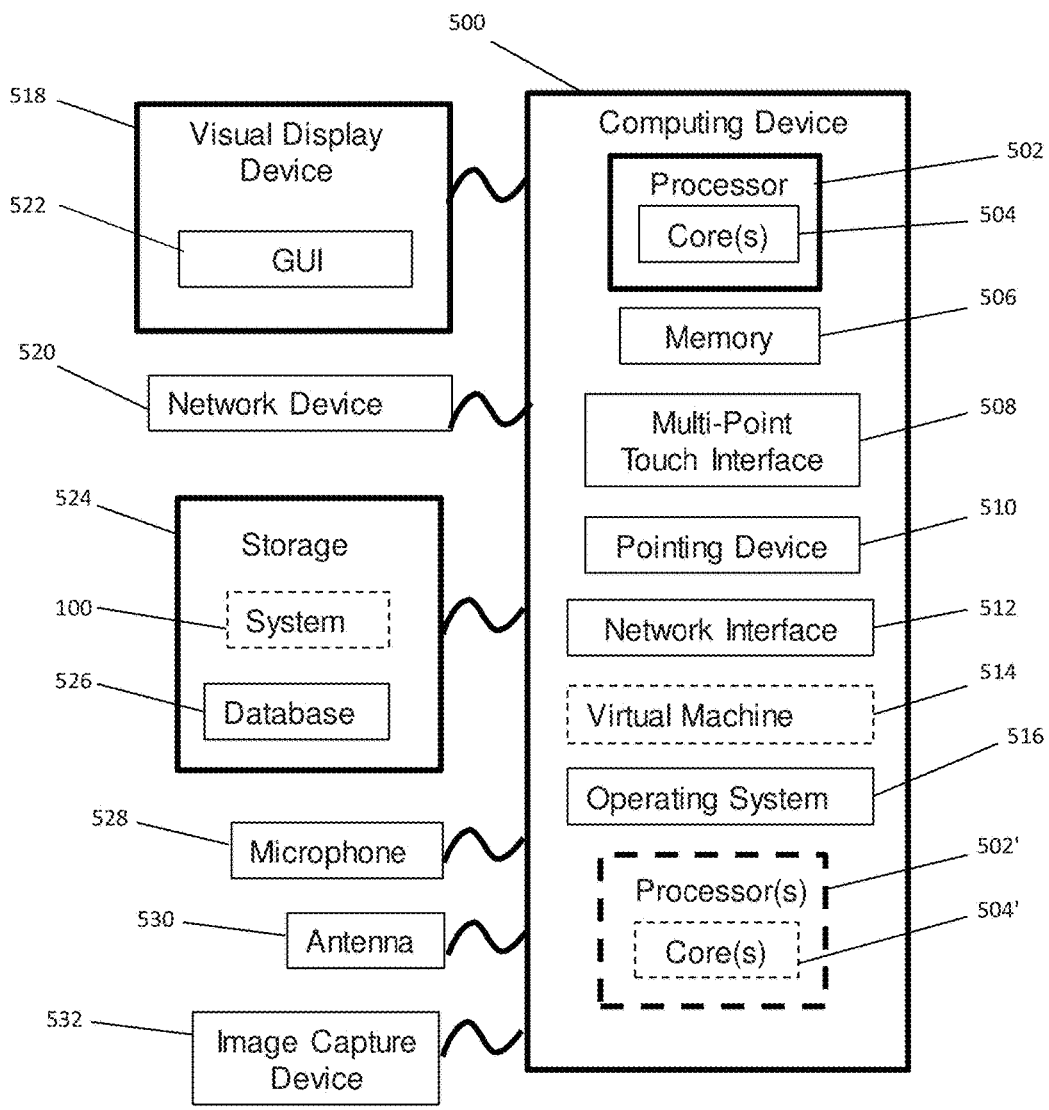
FIG. 5 is a block diagram of an exemplary computing device that can be used to implement exemplary embodiments of the indoor drone system described herein.

FIG. 5 is a block diagram of an exemplary computing device 500 that may be used to implement exemplary embodiments of the indoor drone system 100 described herein. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the indoor drone system 100. The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 518, such as a computer monitor, which may display one or more graphical user interfaces 522 that may be provided in accordance with exemplary embodiments. The computing device 500 may include other I/O devices for receiving input from a user, for example, a keyboard or any suitable multi-point touch interface 508, a pointing device 510 (e.g., a mouse), a microphone 528, and/or an image capturing device 532 (e.g., a camera or scanner). The multi-point touch interface 508 (e.g., keyboard, pin pad, scanner, touch-screen, etc.) and the pointing device 510 (e.g., mouse, stylus pen, etc.) may be coupled to the visual display device 518. The computing device 500 may include other suitable conventional I/O peripherals.

The computing device 500 may also include one or more storage devices 524, such as a hard-drive, CD-ROM, or other computer readable media, for storing data and computer-readable instructions and/or software that implement exemplary embodiments of the indoor drone system 100 described herein. Exemplary storage device 524 may also store one or more databases for storing any suitable information required to implement exemplary embodiments. For example, exemplary storage device 524 can store one or more databases 526 for storing information, such as a map of the indoor facility, route instructions for the drone 410, assigned pairings of storage units and storage cases, and/or any other information to be used by embodiments of the system 100. The databases may be updated manually or automatically at any suitable time to add, delete, and/or update one or more items in the databases.

The computing device 500 can include a network interface 512 configured to interface via one or more network devices 520 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing device 500 can include one or more antennas 530 to facilitate wireless communication (e.g., via the network interface) between the computing device 500 and a network. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 500 may run operating system 516, such as versions of the Microsoft® Windows® operating system, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 516 may be run in native mode or emulated mode. In an exemplary embodiment, the operating system 516 may be run on one or more cloud machine instances.

Figure 6:
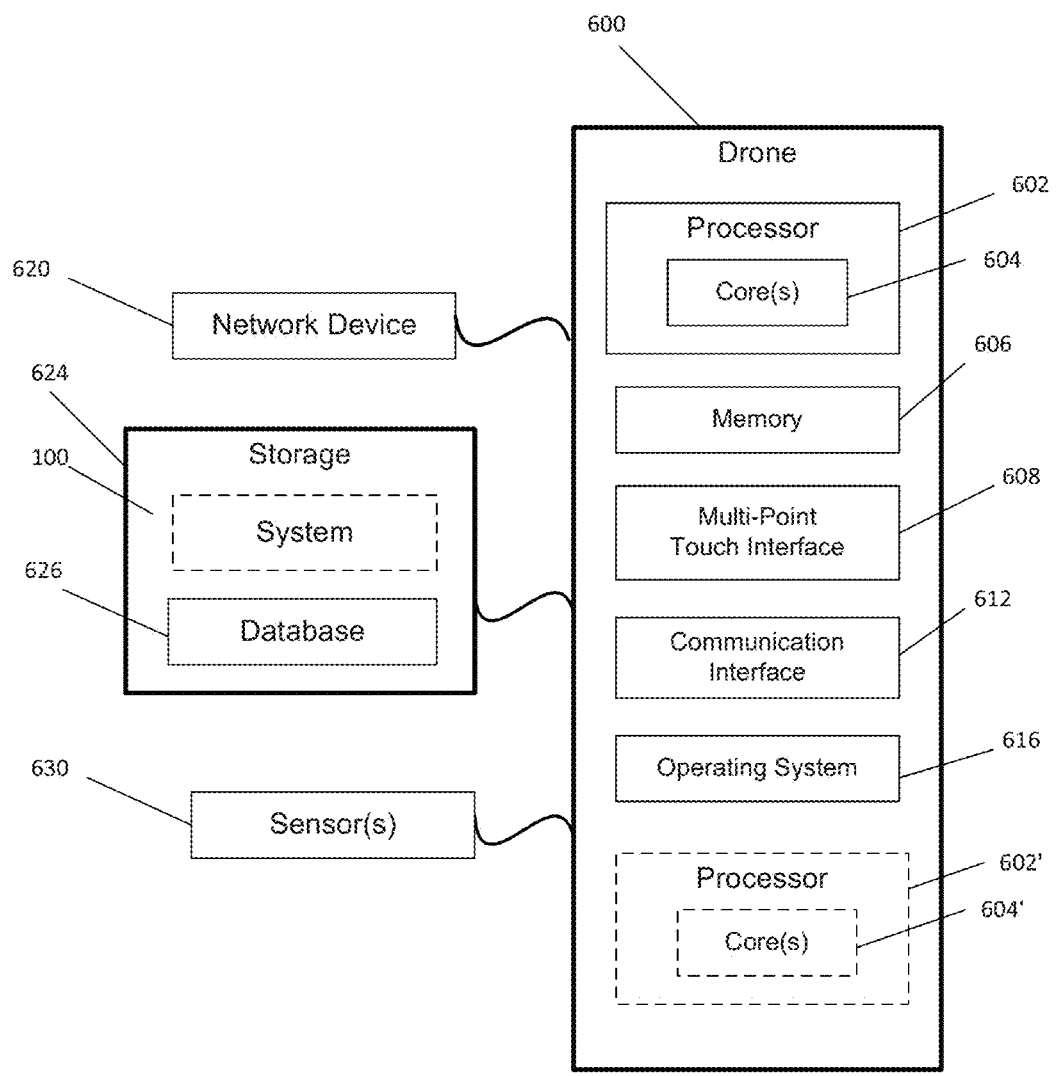
FIG. 6 is a block diagram of an exemplary drone that can be used to implement exemplary embodiments of the indoor drone system described herein.

FIG. 6 is a block diagram of an exemplary drone 600 that may be used to implement exemplary embodiments of the indoor drone system 100 described herein. The drone 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the drone 600 may store computer-readable and computer-executable instructions or software for implementing exemplary embodiments of the indoor drone system 100. The drone 600 may also include configurable and/or programmable processor 602 and associated core 604, and optionally, one or more additional configurable and/or programmable processor(s) 602' and associated core(s) 604' (for example, in the case of the drone having multiple processors/cores), for executing computer-readable and computer-executable instructions or software stored in the memory 606 and other programs for controlling the drone hardware. Processor 602 and processor(s) 602' may each be a single core processor or multiple core (604 and 604') processor. Memory 606 may include a computer system memory or random access memory, such as DRAM, SRAM, EDO RAM, and the like. Memory 606 may include other types of memory as well, or combinations thereof.

The drone 600 may also include one or more storage devices 624, such as a hard-drive, CD-ROM, or other computer readable media, for storing data and computer-readable instructions and/or software that implement exemplary embodiments of the indoor drone system 100 described herein. Exemplary storage device 624 may also store one or more databases for storing any suitable information required to implement exemplary embodiments. For example, exemplary storage device 624 can store one or more databases 626 for storing information, such as route instructions, sensed data, scanned identifiers from the storage unit and storage cases identifiers, and other data to be used by embodiments of the system 100. The databases may be updated manually or automatically at any suitable time to add, delete, and/or update one or more items in the databases.

The drone 600 may be coupled to one or more sensors 630. The sensors may include, but are not limited to, location sensors, optical code sensors, infrared sensors, distance sensors, motion detectors, thermal sensors, sonar sensors, and the like.

The drone 600 can include a communication interface 612 configured to interface via one or more network devices 620 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the network interface 612 may include a built-in network adapter, network interface card, PCMCIA network card, card bus network adapter, wireless network adapter, USB network adapter, modem or any other device suitable for interfacing the drone 600 to any type of network capable of communication and performing the operations described herein. Moreover, the drone 600 may be any computer system, or other form of computing or telecommunications device that is capable of communication and that has sufficient processor power and memory capacity to perform the operations described herein.

The drone 600 may run operating system 616, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 616 may be run in native mode or emulated mode. In an exemplary embodiment, the operating system 616 may be run on one or more cloud machine instances.

The following description is presented to enable any person skilled in the art to create and use a computer system configuration and related method and article of manufacture for an indoor drone system. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A drone system comprising:
   an autonomous drone configured for autonomous navigation through an indoor facility having a plurality of storage units, each storage unit including an optically readable identifier, the autonomous drone including:
   an optical code reader, and
   at least one navigational sensor; and
   a computing system in communication with the autonomous drone, the computing system including a verification module,
   wherein the autonomous drone is configured to operate the optical code reader to scan a first optical machine-readable label containing an identifier that is affixed to a selected storage unit of the plurality of storage units in the indoor facility and to scan a second optical machine readable label affixed to a selected storage case on the selected storage unit, the second optical machine readable label including an identifier for the storage case, the autonomous drone further configured to sense data via the at least one navigational sensor and determine its current location within the indoor facility based on the sensed navigational data; and
   wherein the computing system is configured to communicate with a database holding a set of records of assigned storage unit-storage case combinations, and the verification module is configured to:
   receive the identifier for the selected storage unit and the identifier for the selected storage case from the autonomous drone,
   verify whether the received identifier for the selected storage unit and identifier for the selected storage case is absent as an assigned storage unit-storage case combination in the set of records, and
   generate a notification indicative of the absence in the event the storage unit-storage case combination is absent in the set of records, wherein a location of the storage unit-storage case combination scanned by the autonomous drone is also recorded.

2. The drone system of claim 1, wherein the autonomous drone is coupled to an image capturing device.

3. The drone system of claim 2, wherein the autonomous drone is configured to operate the image capturing device to capture an image of a pattern on a floor of the indoor facility, and the computing system is configured to determine the location of the autonomous drone based on the pattern in the image.

4. The drone system of claim 2, wherein the autonomous drone is configured to capture images and video via the image capturing device while navigating the indoor facility.

5. The drone system of claim 1, wherein the autonomous drone is coupled to an infrared sensor to detect obstacles in the indoor facility during navigation.

6. The drone system of claim 1 wherein the notification is transmitted to a designated individual.

7. The drone system of claim 6, wherein the notification is logged in a database.

8. The drone system of claim 1, wherein the drone is configured to:
   receive a provided storage case identifier communicated from the computing system, autonomously navigate the indoor facility and scan one or more optical machine-readable labels affixed to one or more of a plurality of storage cases to locate an optical machine-readable label corresponding to the provided storage case identifier, and store, upon locating the provided storage case identifier, a location of the optical machine-readable label corresponding to the provided storage case identifier.

9. A method for autonomous drone navigation:

navigating an autonomous drone through an indoor facility having a plurality of storage units, each storage unit including an optical readable identifier, the autonomous drone including an optical code reader and at least one navigational sensor;

operating the optical code reader to scan a first optical machine-readable label containing an identifier affixed to a selected storage unit of the plurality of storage units in the indoor facility, and to scan a second optical machine readable label affixed to a selected storage case on the selected storage unit, the second optical machine readable label including an identifier for the storage case, sensing data via the at least one navigational sensor;

determining the drone's current location within the indoor facility based on the sensed navigational data;

receiving the identifier for the selected storage unit and the identifier for the selected storage case from the autonomous drone at a verification module included in a computing system in communication with the autonomous drone;

verifying at the verification module whether the received identifier for the selected storage unit and identifier for the selected storage case is absent as an assigned storage unit-storage case combination in a set of records of a database in communication with the computing system; and generating a notification indicative of the absence in the event the storage unit-storage case combination is absent in the set of records, wherein a location of the storage unit-storage case combination scanned by the autonomous drone is also recorded.

10. The method of claim 9, wherein the autonomous drone is coupled to an image capturing device.

11. The method of claim 10, further comprising:

operating the image capturing device to capture an image of a pattern on a floor of the indoor facility; and determining the location of the autonomous drone based on the pattern in the image.

12. The method of claim 10, further comprising:

capturing images and video via the image capturing device while navigating the indoor facility.

13. The method of claim 9, wherein the autonomous drone is coupled to an infrared sensor to detect obstacles in the indoor facility during navigation.

14. The method of claim 9, wherein the notification is transmitted to a designated individual.

15. The method of claim 14, further comprising logging the notification in a database.

16. The method of claim 9, further comprising:

receiving, with the autonomous drone, a provided storage case identifier communicated from the computing system;

autonomously navigating the autonomous drone through the indoor facility and scanning one or more optical machine-readable labels affixed to one or more of the plurality of storage cases to locate an optical machine-readable label corresponding to the provided storage case identifier; and storing, upon locating the provided storage case identifier, a location of the optical machine-readable label corresponding to the provided storage case identifier.

* * * * *